United States Patent [19]
Takagi et al.

[11] 3,949,374
[45] Apr. 6, 1976

[54] ARRANGEMENT FOR SUPPLYING INPUT SIGNALS TO CENTRAL PROCESSING UNITS WITHOUT INTERRUPTION OF PROGRAMS

[75] Inventors: Toshio Takagi; Shiro Seki; Akihiro Ito, all of Tokyo, Japan

[73] Assignees: Tokyo Denryoku Kabushiki Kaisha; Kabushiki Kaisha Meidensha, both of Tokyo, Japan

[22] Filed: June 24, 1974

[21] Appl. No.: 482,501

[30] Foreign Application Priority Data
June 28, 1973   Japan.............................. 48-73150
June 28, 1973   Japan.............................. 48-73151

[52] U.S. Cl. ............................................. 340/172.5
[51] Int. Cl.² ............................................. G06F 3/00
[58] Field of Search ................................. 340/172.5

[56] References Cited
UNITED STATES PATENTS

| | | |
|---|---|---|
| 3,548,382 | 6/1970 | Lichty et al..................... 340/172.5 |
| 3,611,300 | 10/1971 | Aldrich et al..................... 340/172.5 |
| 3,699,529 | 10/1972 | Beyers ............................. 340/172.5 |
| 3,710,351 | 1/1973 | Nakamura ....................... 340/172.5 |

*Primary Examiner*—Raulfe B. Zache
*Attorney, Agent, or Firm*—Flynn & Frishauf

[57] ABSTRACT

A read-out signal generator supplies read-out signals through a read-out bus bar to sources of first data signals and buffer memories storing second data signals produced by accompanying central processing units (CPU's) to make the read-out bus bar transmit also the first and second data signals in timed relation to the read-out signals. A coupling device supplies read-in signals with reference to the read-out signals and transfers the first and second data signals from the read-out bus bar to a read-in bus bar, which supplies the transferred data signals to the CPU's in predetermined time relation to the read-in signals. The coupling device may either be a mere connection (in which case the read-out signals serve as the read-in signals) or a data bank.

12 Claims, 9 Drawing Figures

ARRANGEMENT FOR SUPPLYING INPUT SIGNALS TO CENTRAL PROCESSING UNITS WITHOUT INTERRUPTION OF PROGRAMS

BACKGROUND OF THE INVENTION

This invention relates to an arrangement for supplying those input data signals to a plurality of central processing units which may be first or original data signals supplied from signal sources and second data signals resulting from data processing carried out by the central processing units or even third data signals derived from signal sources and central processing units placed at a remote location. The arrangement according to this invention is particularly suited for use in putting a plurality of central processing units into cooperation to carry out supervision and control over an electric power system as described in U.S. patent application Ser. No. 386,382 filed by Toshio Takagi, one of the present joint inventors, on Aug. 7, 1973, assigor to Tokyo Denryoku Kabushiki Kaisha, one of present assignees. U.S. application Ser. No. 386,382 was abandoned in favor of continuation application Ser. No. 562,452 filed Mar. 27, 1975. This invention will therefore be described in the following in specific conjunction with an electronic data processing system for protecting an electric power transmission system.

As the power dealt with by electric power transmission systems has grown and is still growing larger, it is the general tendency that high speed and high reliability are progressively required to protect the systems and to detect and dispose of a trouble that has happened to occur in the systems. In extra-high tension transmission systems, the protection must more fully be insured. In order to cope with these requirements for high speed and reliability, electronic data processing has been introduced in supervision and control of large-power or extra-high tension electric power systems. It is, however, to be pointed out that the data to be dealt with by the electronic data processing system are continuous and that a large number of data must be dealt with per unit time. By way of example, the data to be dealt with for a substation in an electric power system are instantaneous values of voltages and currents of the power line, bus bar, transformer, and the like to be protected and the states of on-off of the circuit breakers and line switches and tap points of the voltage regulators. It is desired at present to resort to a plurality of central processing units for respective manners of data processing because the data processing must be carried out on these data signals at a high speed. For instance, the central processing units are preassigned to main protection of the transmission line, backup protection thereof, protection of the bus bar, protection of the voltage regulators, and so forth. It becomes now necessary that the central processing units share the first data signals mentioned above and those second data signals that result from data processing carried out by the same and/or other central processing units, so as to produce desired output signals for enabling the transmission line, bus bar, or voltage regulator protection devices to operate.

On coupling two central processing units for cooperation, it has been the practice to select one thereof as the master processor for producing write-in commands and the other as a slave processor for carrying out the write-in operation in compliance with the write-in commands. More particularly, first data signals representative of the instantaneous value of voltages and currents and the states of on-off and tap points may be supplied to both processors. On supplying the second data signals representative of, for example, the effective values of the voltages and currents produced by the master processor to the slave processor, the master processor delivers a write-in command to the slave processor. The slave processor thereupon goes to trap or carries out interruption of the program, namely, suspension of the program being executed. After the interruption is carried out, the slave processor notifies the master processor of the fact that the slave processor is ready for write-in of the second data signals which the master processor will supply. The master processor now delivers the data signals to the slave processor to make the latter write-in the data signals. When the number of the central processing units is two, it is relatively easy thus to supply the first and second data signals to the central processing units to make them carry out the desired data processing. It turns, however, difficult to make three or more central processing units carry out the desired data processing because not only an increasing number of connections become necessary but also the software for interruption of programs becomes complicated. This results in additional disadvantages of reduced speed and reliability. In some cases, local electronic data processing systems are installed at various points of a large-scale electric power system and a central station carries out supervisory control of the power system through the local data processing systems. In such a supervisory control system, it becomes additionally necessary to supply the third data signals mentioned at the outset of the instant specification to the central processing units of each data processing system. This renders the problems of coupling the central processing units more serious.

SUMMARY OF THE INVENTION

It is therefore an object of the present invention to provide an arrangement for use in combination with an electronic data processing system of the type described for supplying, without the problems of interruption of programs, desired input signals to a plurality of central processing units of the data processing system.

It is another object of this invention to provide an arrangement of the type described, with which changes in hardware are unnecessary even when use should be made of additional one or more central processing units in the data processing system.

It is still another object of this invention to provide an arrangement of the type described, with which changes in hardware are unnecessary even when addition should be made of one or more signal sources to supply additional original data signals to the central processing units.

It is yet another object of this invention to provide an arrangement of the type described, with which it is possible to supply the central processing units with data signals produced in a like electronic data processing system situated at a remote location.

An electronic data processing system to which an arrangement according to this invention is applicable comprises a plurality of central processing units coupled to a plurality of sources of first data signals. Each of the central processing units is capable of selecting predetermined data signals from input data signals and carrying out predetermined data processing on the predetermined data signals. The central processing units thus produce second data signals. The arrangement according to this invention is for use in supplying the first and second data signals to the central processing units as the input data signals and comprises a buffer memory to be connected to each of the central processing units for storing the second data signals produced by the central processing unit connected thereto, read-out bus bar means, read-out signal producing means connected to the read-out bus bar means for producing read-out signals, and a plurality of output devices connected to the read-out bus bar means on the one hand and to the buffer memories on the other hand and to be connected to the signal sources also on the other hand for deriving the first and second data signals from the signal sources and buffer memories, respectively, in response to the read-out signals supplied from the read-out signal producing means through the read-out bus bar means, which now transmits also the first and second data signals derived by the output devices. The arrangement further comprises read-in bus bar means to be connected to the central processing units and coupling means coupled to the read-out and read-in bus bar means for transferring the first and second data signals from the read-out bus bar means to the read-in bus bar means so that the read-in bus bar means may transmit the first and second data signals to the central processing units as the input data signals.

Inasmuch as the output devices derive the first and second data signals in response to the read-out signals, the read-out bus bar means transmits the derived data signals in timed relation to the read-out signals. The read-out signals may therefore be regarded as a set of address signals. Each of the read-out and read-in bus bar means may comprise address bus bar means for the read-out signals and data bus bar means for the first and second data signals. Each of the address and data bus bar means may comprise a plurality of bus bars, for example, one for the first data signals and the other for the second data signals. The read-out signals and the first and second data signals may be transmitted through a single bus bar in a time division fashion.

The coupling means may comprise connecting means directly connecting the read-out and read-in bus bar means for transmitting the first and second data signals. The connecting means may transmit also the read-out signals, in which case the read-in bus bar means transmits the first and second data signals in the above-mentioned timed relation to the read-out signals. In case each of the read-out and read-in bus bar means comprises address and data bus bar means, the connecting means may directly connect the read-out and read-in data bus bar means. The read-out and read-in address bus bar means may also be directly connected by the connecting means. Alternatively, the coupling means may comprise read-in signal producing means coupled to the read-out signal producing means and connected to the read-in address bus bar means for producing read-in signals with reference to the read-out signals so that the read-in data bus bar means may transmit the first and second data signals in predetermined time relation to the read-in signals.

The coupling means may alternatively comprise data bank means connected to the read-out and read-in bus bar means for storing the first and second data signals supplied from the read-out bus bar means with reference to the read-out signals supplied also from the read-out bus bar means. The data bank means reproduces the first and second data signals to supply the reproduced signals to the read-in bus bar means and produces read-in signals with reference to the read-out signals to supply the read-in signals to the read-in bus bar means so that the read-in bus bar means may transmit the first and second data signals from the data bank means to the central processing units in predetermined time relation to the read-in signals transmitted also therethrough. In case the data processing system is coupled to a second electronic data processing system through a communication line, the data bank means stores third data signals produced in the second data processing system in the manner described in conjunction with the first and second data signals and sent from the second data processing system through the communication line and reproduces the third data signals and produces additional read-in signals therefor to supply the third data signals and the additional read-in signals to the central processing units through the read-in bus bar means.

It will now be appreciated that the second data processing system may be dealt with as one of the signal sources without the use of the data bank means. Also, the read-in signals including the additional read-in signals may be looked upon as another set of address signals.

In order to raise the efficiency of selection of the predetermined data signals carried out by the central processing units, the read-in bus bar means may comprise read-in data-address bus bar means and a plurality of input devices connected to the read-in data-address bus bar means and to be connected to the central processing units. The data-address bus bar means transmits the first and second data signals end, as the case may be, the third data signals as well as the read-out or read-in signals. Responsive to each of preselected ones of the read-out or read-in signals, each of the input devices supplies that one of the first and second data signals and, if any, the third data signals to the central processing unit connected thereto which is transmitted through the read-in data-address bus bar means in the timed relation or predetermined time relation to the above-mentioned one preselected read-out or read-in signal.

The read-out or read-in signals and the data signals may be arranged in frames of time division multiplexed signals during their transmission through the read-out or read-in bus bar means. The read-out signals may therefore be coded signals determining the channels or words in each frame. Alternatively, each of the read-out signals may be a frame synchronizing signal, in which case the output devices may produce individual address pulses therefor by delaying or otherwise processing the frame synchronizing signal. Each of or some of the signal sources may be an interconnection control unit described in the above-referenced patent application.

DESCRIPTION OF PREFERRED EMBODIMENTS:

Referring to FIGS. 1, 5, 6, and 8 at first, an electronic data processing system to which an arrangement according to the present invention is applicable to make the data processing system carry out supervisory control of an electric power system comprises a plurality of central processing units $C_1, C_2, \ldots$, and $C_k$ coupled to a plurality of receiving units $R_1, R_2, \ldots$, and $R_n$ for receiving first data signals through data channels $CH_1$, $CH_2, \ldots$, and $CH_n$, respectively, from electric houses which may be a power station, substations, switching stations, and transmission lines of the power system to be protected. The receiving units serve $R_1$-$R_n$ as sources of the first data signals so far as the data processing system is concerned. The first data signals of each data channel may be digital signals representative of instantaneous values of voltages and currents at various points of an electric house and of the states of on-off of the circuit breakers and line switches and tap points of the voltage regulators installed in a power station or substation. Each of the central processing units is capable of carrying out predetermined data processing on predetermined data signals read into a main memory (not shown) thereof. The central processing units $C_1$-$C_k$ thus produce second data signals, such as digital signals representative of the effective values of the voltages and currents, the power, the frequency, and the like. The data processing system further comprises an output interface E connected to a particular one of the central processing units $C_k$ for producing control signals on output lines $O_1, O_2, \ldots$, and $O_n$ that correspond to the data channels $CH_1, CH_2, \ldots$, and $CH_n$, respectively. The control signals applied to each of the output lines may be coded digital signals for controlling various protection devices to carry out protection of installations in the electric house concerned.

Figure 1:
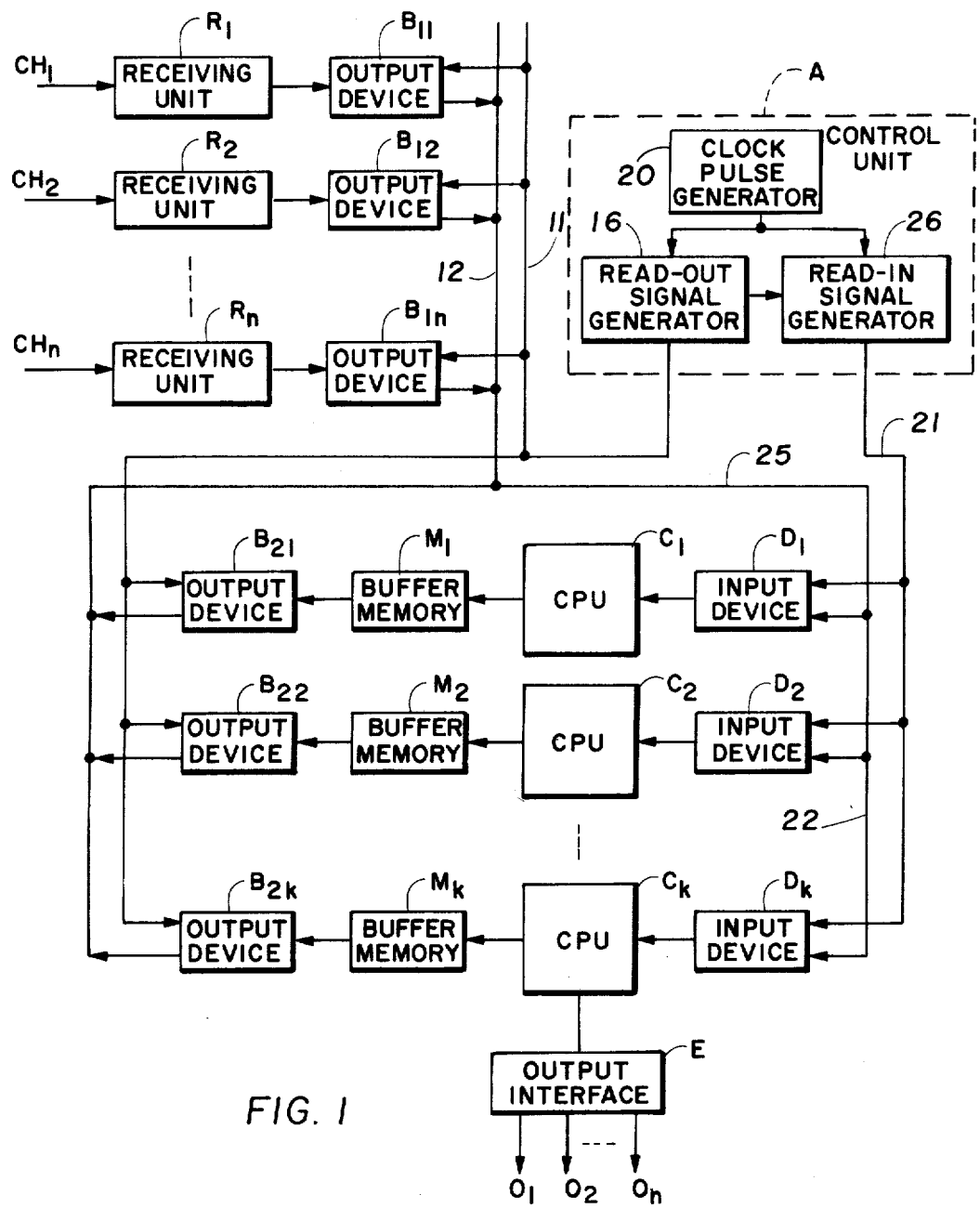
FIG. 1 shows in blocks an arrangement according to a first embodiment of the instant invention together with a plurality of central processing units coupled to a plurality of signal sources.

Referring more specifically to FIG. 1, an arrangement according to a first embodiment of this invention comprises buffer memories $M_1, M_2, \ldots$, and $M_k$ connected to the respective central processing units $C_1$-$C_k$ for storing the second data signals produced by the accompanying central processing units, a read-out address bus bar 11, a read-out data bus bar 12, a read-out signal generator 16 in a control unit A for producing read-out signals and supplying the read-out signals to the read-out address bus bar 11, a plurality of first output or read-out devices $B_{11}, B_{12}, \ldots$, and $B_{1n}$ between the respective receiving units $R_1$-$R_n$ and the read-out address and data bus bars 11 and 12, and a plurality of second output or read-out devices $B_{21}, B_{22}, \ldots$, and $B_{2k}$ between the respective buffer memories $M_1$-$M_k$ and the read-out address and data bus bars 11 and 12. The control unit A includes a clock pulse generator 20 for producing clock signals. In an example of the first embodiment, the read-out signals are coded signals allotted to the respective first and second output devices. It is easy for those skilled in pulse techniques, such as pulse counter techniques, to design various read-out signal generators that are controlled by the clock signals to cyclically produce such coded read-out signals in a time division fashion. Supplied with these coded read-out signals through the read-out address bus bar 11, each of the first and second output devices transmits the first or second data signals to the read-out data bus bar 12 each time the read-out signal of the code allotted thereto appears in the frames of time division multiplexed signals. It is easy for those skilled in pulse techniques to manufacture such an output device, for example, by a combination of a decoder and an AND gate. It will also be easy for those skilled in the digital transmission art to make each first output device carry out parity check on sending the first data signals to the read-out data bus bar 12.

Figure 2:
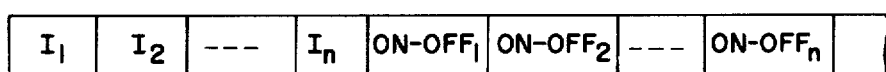
FIG. 2 shows a portion of a frame of time division multiplexed data signals for illustrating operation of an arrangement according to the first embodiment.

Referring to FIGS. 1 and 2, it may be assumed in connection with the example of the first embodiment that each of the receiving units $R_1, R_2, \ldots$, and $R_n$ receives first data signals representative of instantaneous currents and of the states of on-off and that two series of coded read-out signals are allotted in a frame of the time division multiplexed signals to the respective first output devices $B_{11}, B_{12}, \ldots$, and $B_{1n}$. Responsive to the read-out signals produced during a first portion of each frame, the read-out data bus bar 12 is supplied with digital signals $I_1, I_2, \ldots$, and $I_n$ representative of the instantaneous currents for the respective data channels $CH_1, CH_2, \ldots$, and $CH_n$. Responsive to the read-out signals produced during a next following portion of the frame, the read-out data bus bar 12 is supplied with digital signals ON-OFF$_1$, ON-OFF$_2, \ldots$, and ON-OFF$_n$ representative of the states of on-off. In the subsequent portion (not shown) of each frame, the read-out data bus bar 12 may be supplied with the second data signals. The read-out data bus bar 12 is thus supplied with the first and second data signals in timed relation to the read-out signals and, in the example being illustrated, in a time division fashion.

Still further referring to FIG. 1, the arrangement according to the first embodiment further comprises a read-in address bus bar 21, a read-in data bus bar 22, a connection line 25 directly connecting the read-out and read-in data bus bars 12 and 22, and a read-in signal generator 26 coupled to the read-out signal generator 16 in the control unit A and connected to the read-in address bus bar 21 for producing read-in signals with reference to the read-out signals and supplying the read-in signals to the read-in address bus bar 21. Due to the connection line 25 and to the presence of timing between the read-out and read-in signals, the read-in data bus bar 22 transmits the first and second data signals in predetermined time relation to the read-in signals, which provide addresses for the first and second data signals in the read-in data bus bar 22. The arrangement according to the first embodiment still further comprises a plurality of input or read-in devices $D_1, D_2, \ldots$, and $D_k$ between the respective central processing units $C_1, C_2, \ldots$, and $C_k$ and the read-in address and data bus bars 21 and 22. Each of the input devices is preset with preselected ones of the read-in signals so that the input devices may supply that one of the first and second data signals to the central processing unit connected thereto which is transmitted in the read-in data bus bar 22 in the predetermined time relation to each of the preselected read-in signals transmitted in the read-in address bus bar 21. It is easy for those skilled in the art to manufacture the read-in signal generator 26 and the input devices in the manner similar to the read-out signal generator 16 and the output devices. In connection with the above, it is worthwhile to note that the results of the data processing carried out at first on the first or original data signals may be subjected to progressive data processing and supplied to the output interface E through the particular central processing unit $C_k$.

Figures 3A, 3B:
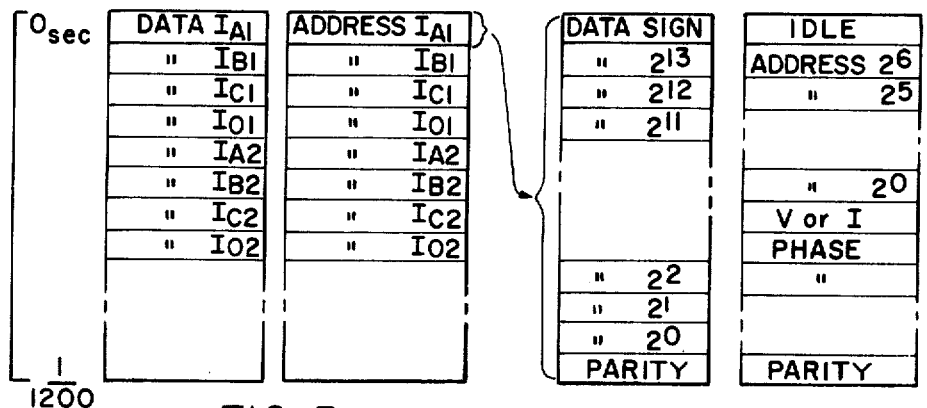
FIGS. 3a and 3b show time division multiplexed data and address signal frames for illustrating an example of operation of an electronic data processing system to which this invention is applied.
Figure 4:
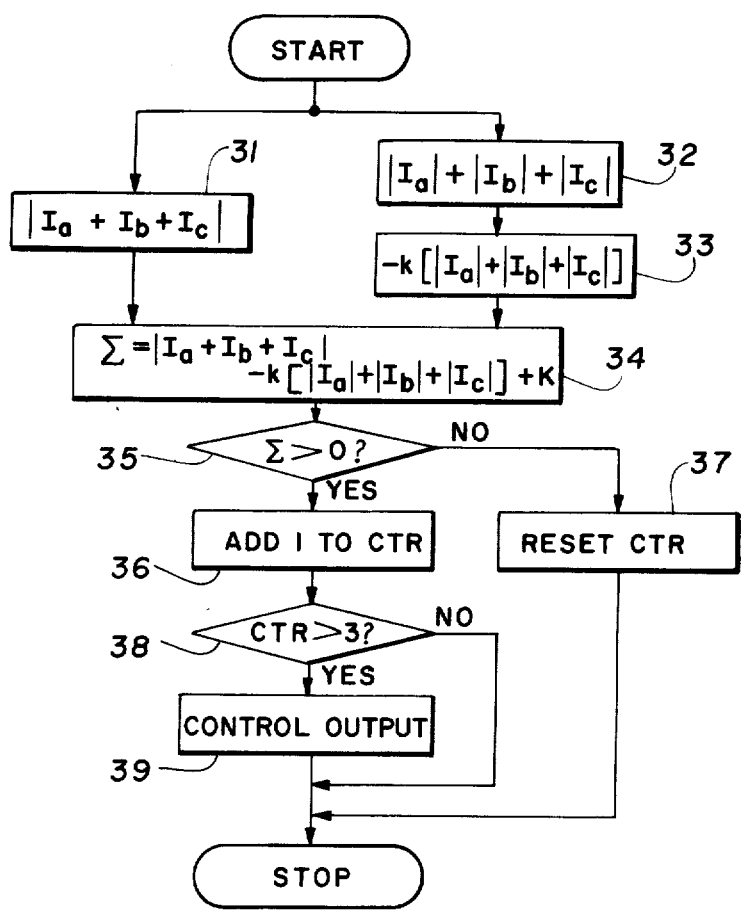
FIG. 4 is a schematic flow chart of a program for use in illustrating the example of operation.

Referring to FIGS. 1, 3a and 3b, a common frame period of the time division multiplexed data and address signals transmitted in a practical example through the read-in data and address bus bars 22 and 21 may be 1/1200 second. In this practical example, each of the read-in address and data bus bars 21 and 22 may consist of 16 conductors for transmitting bit-parallel word-series address and data signals. Each frame may consist of about 150 words. As exemplified in FIG. 3a, the successive data words may represent the instantaneous values of the A-phase, B-phase, C-phase, and zero-phase currents at a point, similar values at another point, and so forth. The address words may represent the respective addresses of the corresponding data words. As illustrated in FIG. 3b, the first bit of the data word may represent the sign of the instantaneous value. The second through 15 bits may be the bits for the instantaneous value. The 16 bit may be the bit for the parity check. The first bit of the address word may be idle. The second through 8 bits may be the bits for the address. The ninth through eleventh bits may represent whether the corresponding data word gives the value of voltage or current and the value of the A-phase, B-phase, C-phase, or zero-phase. The 16 bit may be the parity check bit. Although it is reminded here in connection with FIG. 3b that the bits of each word are transmitted bit-parallel, the data and address words may be transmitted in bit-series in single read-in data and address bus bars 22 and 21, respectively.

Referring to FIGS. 1, 3a, 3b, and 4, it may be surmised for illustration of operation of the data processing system that the first and second data words supplied through the first channel $CH_1$ give the instantaneous values of currents $I_a$ and $I_b$ flowing through two feeders for a power bus bar in a substation (not shown), that the first data word supplied through the second channel $CH_2$ gives the instantaneous values of current $I_c$ flowing into a connection between the bus bar and another power bus bar in the substation, and that the addresses given in the corresponding address words are 0000000, 0000001, and 0100000, respectively. It is further presumed that the first central processing unit $C_1$ carries out data processing for protection of the first-mentioned power bus bar. The program for this protection is based on the fact that the currents flowing into the bus bar is equal to that flowing out thereof in normal operation. It is accordingly possible to supervise the bus bar in question by checking whether $$|I_a + I_b + I_c| - k\{|I_a| + |I_b| + |I_c|\} + K > 0$$

holds or not, where $k$ is a factor for correcting the current-versus-output characteristics of the current transformer (not shown) for measuring the currents $I_a$, $I_b$, and $I_c$ and K is a constant predetermined in consideration of the full scale error. It should be understood that the factor $k$ has no relation to the suffix $k$ for the particular central processing unit $C_k$ and the related circuit elements. The program stored in the afore-mentioned main memory of the first central processing unit $C_1$ is therefore represented by the flow chart depicted in FIG. 4. On the other hand, the preselected addresses set in the input device $D_1$ are 0000000, 0000001, and 0100000. As shown at 31, the central processing unit $C_1$ receives the first data signals representative of the currents $I_a$, $I_b$, and $I_c$ measured at a certain instant, calculates the sum, and changes the sign bit of the sum if the sign bit is indicative of a negative number to derive the absolute value of the sum. The unit $C_1$ similarly changes the sign bits of the respective current data signals $I_a$, $I_b$, and $I_c$ and calculates the sum of the absolute values at 32. The unit $C_1$ multiplies the sum of the absolute values by the factor $k$ and changes the sign bit of the product at 33. The unit $C_1$ calculates the sum of the first-mentioned absolute value, the sign-changed product, and the constant K at 34. The unit $C_1$ checks at 35 if the sum derived at 34 is greater than zero or not. When the sum is greater than zero, it is likely that the circuit including the bus bar in question is subjected to a fault. At 36, one is put in a counter (not shown) of the central processing unit $C_1$. So long as the sum derived at 34 is greater than zero, one is repeatedly added to the content of the counter at 36 as the successive instantaneous values of the currents $I_a$, $I_b$, and $I_c$ are processed in the manner thus far described. When the sum in question turns to be equal to or less than zero, the counter is reset at 37. Thus, the content of the counter represents the duration of the possible fault. The central processing unit $C_1$ checks at 38 if the content of the counter is greater than three or not. In the affirmative case, the unit $C_1$ produces a control output at 39 which may be processed by the particular central processing unit $C_k$, if necessary, and is sent through the output interface E and the output lines $O_1$ and $O_2$ to cut off at least pertinent one of the circuit breakers interposed in the feeders and the connection. When the first central processing unit $C_1$ finds at 38 the content of the counter to be equal to or less than three, when the counter is reset at 37, or when the unit $C_1$ produces a control output at 39, the program comes to an end.

Figure 5:
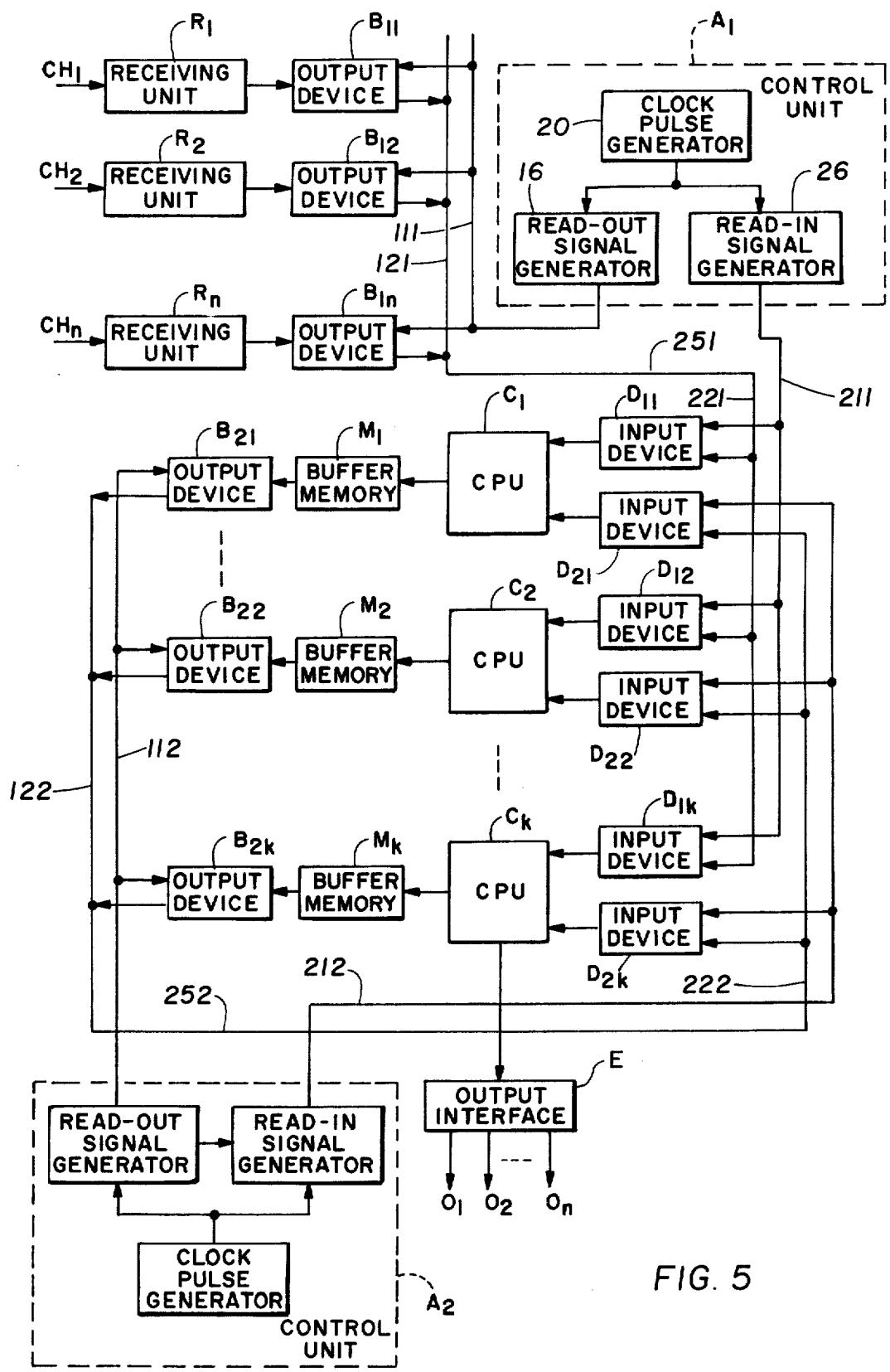
FIG. 5 shows an arrangement according to a second embodiment of this invention in the manner in which FIG. 1 does.

Referring to FIG. 5, an arrangement according to a second embodiment of this invention comprises read-out address bus bar means comprising a first and a second read-out address bus bar 111 and 112, read-out data bus bar means comprising a first and a second read-out data bus bar 121 and 122, read-in address bus bar means comprising a first and a second read-in address bus bar 211 and 212, and read-in data bus bar means comprising a first and a second read-in data bus bar 221 and 222. The arrangement further comprises a first and a second connection 251 and 252, a first and a second control unit $A_1$ and $A_2$, first input devices $D_{11}$, $D_{12}$, ..., and $D_{1k}$ connected to the respective central processing units $C_1$, $C_2$, ..., and $C_k$, respectively, and second input devices $D_{21}$, $D_{22}$, ..., and $D_{2k}$ likewise connected. The first read-out address and data bus bars 111 and 121 are connected between the first output devices $B_{11}$, $B_{12}$, ..., and $B_{1n}$ and the first control unit $A_1$. The second read-out address and data bus bars 112 and 122 are connected between the second input devices $B_{21}$, $B_{22}$, ..., and $B_{2k}$ and the second control unit $A_2$. The first and second read-in address bus bars 211 and 212 are connected between the first input devices and the first control unit $A_1$ and between the second input devices and the second control unit $A_2$, respectively. The first and second read-in data bus bars 221 and 222 are connected between the first input devices and the first connection 251 and between the second input devices and the second connection 252, respectively. With this embodiment, it is possible to deal with about twice as large amount of data per unit time as compared with the first embodiment. It will now be understood that the second read-out address or data bus bar 112 or 122 may be connected to the second output devices and some of the first output devices if there are a much greater number of receiving units than the central processing units and that each of the first and second output device groups may be further divided into two or more output device subgroups with the number of the bus bars increased accordingly. On the contrary, the data and address signals may be transmitted through a single bus bar in bit-series on each of the read-out and read-in sides, in which case the input devices, if any, can select the data signals with reference to the timed relation thereof to the read-out signals transmitted also through the single read-in bus bar.

Figure 6:
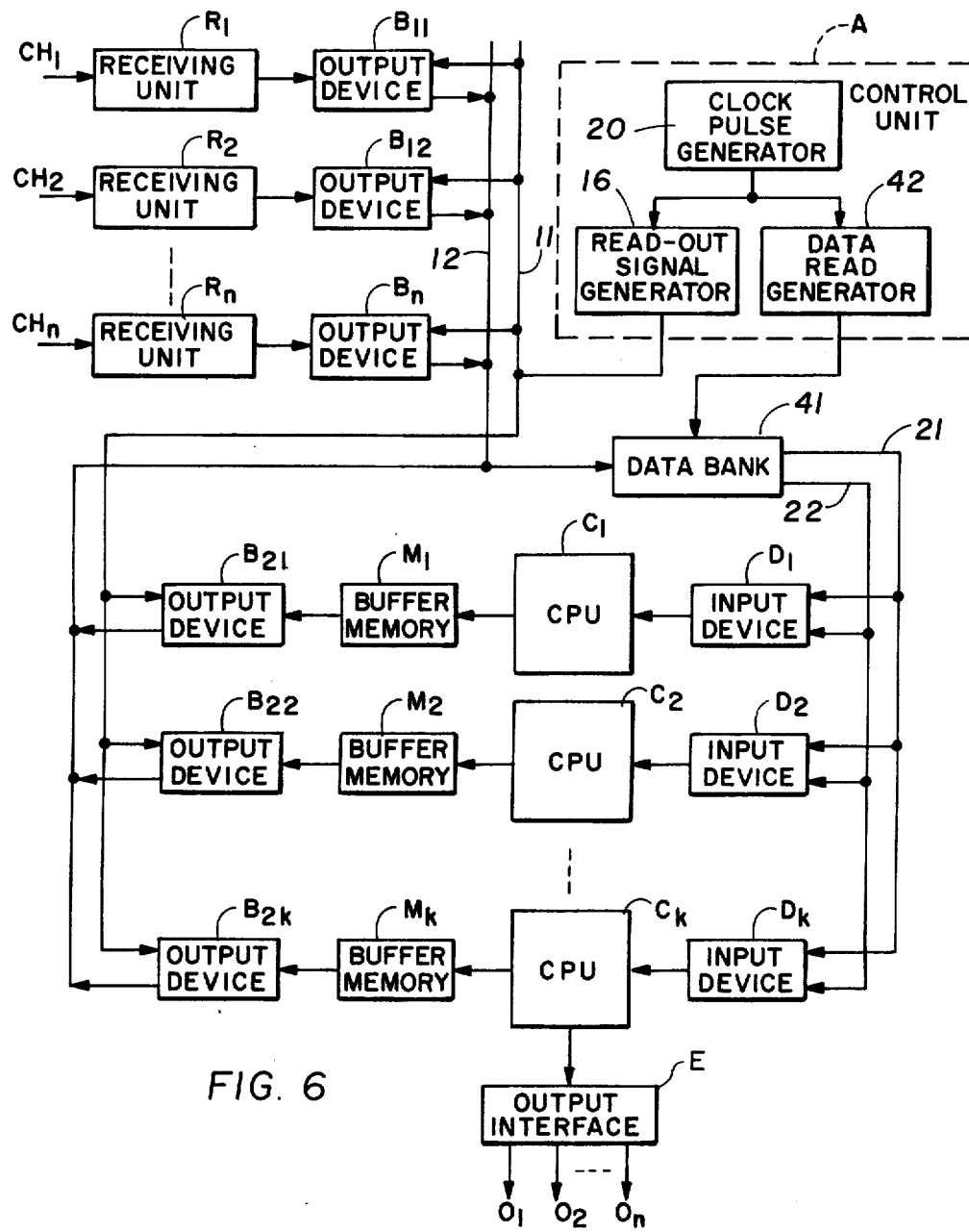
FIG. 6 likewise shows an arrangement according to a third embodiment of this invention.

Referring to FIG. 6, an arrangement according to a third embodiment of this invention comprises a data bank 41 in place of the connection 25 described in conjunction with the first embodiment. The read-in address and data bus bars 21 and 22 are connected to the data bank 41. Instead of the read-in signal generator 16 described in connection with the first embodiment, the control unit A includes a data bank read signal generator 42 for producing data bank read signals. The data bank read signal generator 42 may readily be manufactured by those skilled in the pulse counter art. In the manner known in the art, the data bank 41 comprises a plurality of memory locations (not shown) having variable addresses, stores the first and second data signals supplied from the read-out data bus bar 12 at those memory locations which are determined with reference to the accompanying read-out signals, and supplies in response to the data bank read signals the stored first and second data signals to the read-in data bus bar 22 and those read-in signals to the read-in address bus bar 21 which may be the addresses of the memory locations from where the first and second data signals are read. It is easy for those skilled in the data bank art to supply the read-in signals to the read-in address bus bar 21 in various other manners. Use of the data bank 41 facilitates connection of the data processing system with one or more other electronic data processing systems placed at remote locations.

Figure 7:
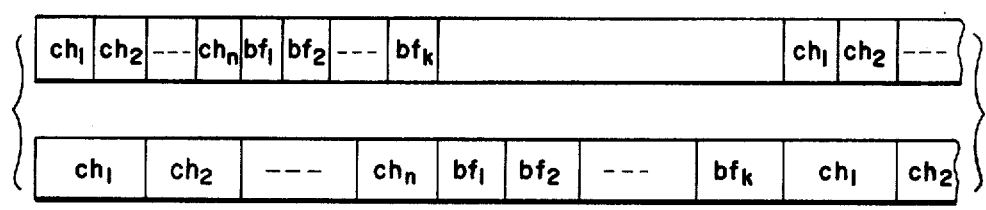
FIG. 7 shows time division multiplexed frame portions for describing an example of operation of the third embodiment.

Referring to FIGS. 6 and 7, the first and second data signals $ch_1, ch_2, \ldots,$ and $ch_n$ and $bf_1, bf_2, \ldots,$ and $bf_k$ may be supplied from the read-out data bus bar 12 to the data bank 41 in every other frames. The data bank 41 may produce the first and second data signals $ch_1, ch_2, \ldots,$ and $ch_n$ and $bf_1, bf_2, \ldots,$ and $bf_k$ to the read-in data bus bar 22 with twice as long frame periods as compared with the signals supplied thereto. This example of operation will suggest the coupling between the data processing system shown and other data processing systems through microwave links through which the signals are usually transmitted with a frame period of 1/600 second.

Figure 8:
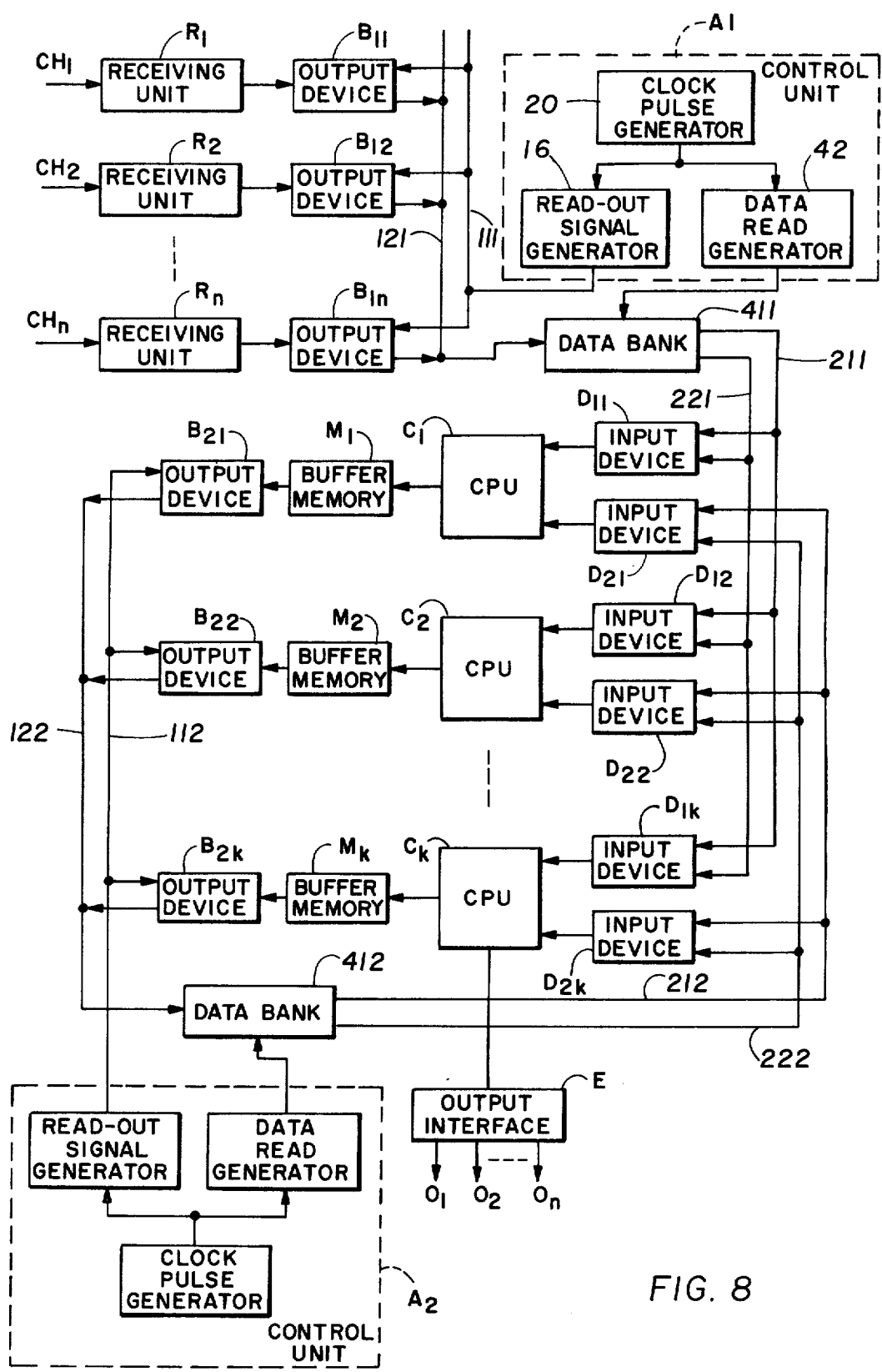
FIG. 8 is a block diagram of an arrangement according to a fourth embodiment of this invention and central processing units coupled to signal sources.

Referring finally to FIG. 8, an arrangement according to a fourth embodiment of this invention is similar to the second and third embodiments in that use is made of first and second read-out address bus bars 111 and 112 and the like and in that use is made of data bank means, here, first and second data banks 411 and 412, respectively. Structure, operation, and advantages of the fourth embodiment will readily and clearly be understood from the figure and the description so far made.

It may be mentioned here that subcommutation and supercommutation known in digital transmission techniques may be resorted to on supplying the first and second data signals to the bus bar means from the output devices and from the data bank means. Random access may also be carried out to some of the receiving units and buffer memories by making the central processing units supply the read-out signals therefor to the bus bar means through connections not shown. An additional data bank for storing the effective values of voltages and currents may be used to raise the speed of data processing by supplying these data to the central processing units directly through an additional data bus bar. Inasmuch as the central processing unit is capable of carrying out selection of the data signals stored in the above-mentioned main memory with the progress of execution of the program, it is possible to dispense with the input devices when only a small amount of the data are to be dealt with.

It should now be reminded that the arrangement according to the present invention enables one or more of the central processing units to progressively process the results of data processing carried out by the same or other central processing unit or units. It is therefore possible to check with a central processing unit the operation of the same processing unit by reading the second data signals into the same processing unit from the buffer memory connected thereto. It is also possible with a central processing unit to supervise the operation of other central processing unit or units. For example, the central processing unit for backup protection of the transmission line is idle while the central processing unit for main protection thereof is busy. This enables the former to supervise whether or not the latter is operating correctly. This also enables the particular central processing unit $C_k$ to check the operation of all the central processing units. In addition, it should be pointed out that no software, such as the program for interruption, is necessary to supply the results of data processing carried out by one or more central processing units to the same or other central processing unit or units. This renders it possible to simplify the hardware, as by reducing the number of connections necessary between the central processing units, and also the software. Furthermore, the timing for the operation of each central processing unit may be independent of the timing for other central processing units and of the timing for read-out of the first data signals. This enables the central processing units to carry out data processing on their individual time bases, if desired. Incidentally, it will have been understood that this invention is applicable to other electronic data processing systems than those for electric power systems. Also, the bus bar as described herein for the data signals may not necessarily be a physical bar.

What is claimed is:

1. A signal supplying arrangement for supplying data signals to an electronic data processing system, the data processing system comprising a plurality of sources of first data signals and a plurality of central processing units coupled to said plurality of sources of first data signals, each of said central processing units including means for selecting predetermined data signals from input data signals and carrying out predetermined data processing operations on said selected predetermined data signals for producing second data signals, said signal supplying arrangement supplying said first and second data signals to said central processing units as the input data signals, and comprising:

a plurality of buffer memories adapted to be connected to respective ones of said central processing units of said data processing system for storing the second data signals produced by said respective central processing units, read-out bus means, read-out signal producing means connected to said read-out bus means for producing read-out signals, said read-out bus means thereby transmitting said read-out signals, a plurality of output devices coupling respective buffer memories to said read-out bus means, said output devices being further adapted to be connected to said signal sources for coupling said first and second data signals to said read-out bus means in response to said read-out signals, said read-out bus means thereby further transmitting said first and second data signals, read-in bus means adapted to be connected to said central processing units, and coupling means coupled to said read-out and read-in bus means for transferring said first and second data signals from said read-out bus means to said read-in bus means, said read-in bus means thereby transmitting said first and second data signals to said central processing units as said input data signals.

2. An arrangement as claimed in claim 1, wherein said coupling means comprises connecting means directly connecting said read-out and read-in bus means for transmitting said first and second data signals and said read-out signals, said connecting means including means for causing said read-in bus means to transmit said first and second data signals in timed relation to said read-out signals transmitted also therethrough.

3. An arrangement as claimed in claim 2, wherein said read-in bus means comprises read-in data-address bus means connected to said connecting means for transmitting said first and second data signals in said timed relation to said read-out signals transmitted also therethrough and a plurality of input devices connected to said read-in data-address bus means and adapted to be connected to said central processing units, each of said input devices being responsive to each of preselected ones of said read-out signals for supplying that preselected one of said first and second data signals to the central processing unit connected to said each input device which is transmitted through said read-in data-address bus means in said timed relation to said each preselected read-out signal.

4. An arrangement as claimed in claim 3, wherein each of said read-out bus means and read-in data-address bus means is a single wire for transmitting said first and second data signals and said read-out signals in a time division fashion.

5. An arrangement as claimed in claim 1, wherein:

said read-out bus means comprises read-out address bus means for transmitting said read-out signals from said read-out signal producing means to said output devices, and read-out data bus means for transmitting said first and second data signals from said output devices in timed relation to said read-out signals, said read-in bus means comprises read-in address bus means and read-in data bus means, said coupling means comprises connecting means directly connecting said read-out and read-in data bus means and read-in signal producing means connected to said read-in address bus means and coupled to said read-out signal producing means for producing read-in signals with reference to said read-out signals whereby said first and second data signals are transmitted in predetermined time relation to said read-in signals, said read-in address bus means thereby transmitting said read-in signals, and said read-in data bus means thereby transmitting said first and second data signals in said predetermined time relation to said read-in signals, and said read-in bus means further comprises a plurality of input devices connected to said read-in address and data bus means and adapted to be connected to said central processing units, each of said input devices being responsive to each of preselected ones of said read-in signals for supplying that preselected one of said first and second data signals to the central processing unit connected to said each input device which is transmitted through said read-in data bus means in said predetermined time relation to said each preselected read-in signal.

6. An arrangement as claimed in claim 5, wherein:

said read-out signal producing means comprises a first read-out signal generator for cyclically producing first read-out signals and a second read-out signal generator for cyclically producing second read-out signals, said output devices comprises first output devices adapted to be connected to said signal sources and second output devices connected to said buffer memories, said read-out address bus means comprises a first read-out address bus for transmitting said first read-out signals from said first read-out signal generator to said first output devices, and a second read-out address bus for transmitting said second read-out signals from said second read-out signal generator to said second output devices, said read-out data bus means comprises a first read-out data bus for transmitting said first data signals from said first output devices to said connecting means in first timed relation to said first read-out signals, and a second read-out data bus for transmitting said second data signals from said second output devices to said connecting means in second timed relation to said second read-out signals, said read-in signal producing means comprises a first read-in signal generator coupled to said first read-out signal generator for producing first read-in signals with reference to said first read-out signals whereby said first data signals are transmitted in first predetermined time relation to said first read-in signals, and a second read-in signal generator coupled to said second read-out signal generator for producing second read-in signals with reference to said second read-out signals whereby said second data signals are transmitted in second predetermined time relation to said second read-in signals, said read-in address bus means comprises a first read-in address bus for transmitting said first read-in signals, and a second read-in address bus for transmitting said second read-in signals, said read-in data bus means comprises a first read-in data bus for transmitting said first data signals from said connecting means in said first predetermined time relation to said first read-in signals, and a second read-in data bus for transmitting said second data signals from said connecting means in said second predetermined time relation to said second read-in signals, and said input devices comprise first input devices connected to said first read-in address and data buses and second input devices connected to said second read-in address and data buses, each of said first input devices being responsive to each of preselected ones of said first read-in signals for supplying that one of said first data signals to the central processing unit connected to said each first input device which is transmitted through said first read-in data bus in said first predetermined time relation to said each preselected first read-in signal, each of said second input devices being responsive to each of preselected ones of said second read-in signals for supplying that one of said second data signals to the central processing unit connected to said each second input device which is transmitted through said second read-in data bus in said second predetermined time relation to said each preselected second read-in signal.

7. An arrangement as claimed in claim 1, wherein said coupling means comprises data bank means connected to said read-out and read-in bus means for storing said first and second data signals supplied from said read-out bus means with reference to said read-out signals supplied also from said read-out bus means and for reproducing said first and second data signals, said read-in bus means thereby transmitting said first and second data signals from said data bank means to said central processing units.

8. An arrangement as claimed in claim 7, wherein: said data bank means includes means for producing read-in signals with reference to said read-out signals whereby said first and second data signals are reproduced in predetermined time relation to said read-in signals, said read-in bus means thereby transmitting said read-in signals, said read-in bus means further transmitting said first and second data signals in said predetermined time relation to said read-in signals, and said read-in bus means comprises read-in data-address bus means for transmitting said first and second data signals in said predetermined time relation to said read-in signals transmitted also therethrough, and a plurality of input devices connected to said read-in data-address bus means and adapted to be connected to said central processing units, each of said input devices being responsive to each of preselected ones of said read-in signals for supplying that one of said first and second data signals to the central processing unit connected to said each input device which is transmitted through said read-in data-address bus means in said predetermined time relation to said each preselected read-in signal.

9. An arrangement as claimed in claim 8, wherein said read-out bus means is a single wire for transmitting said first and second data signals and said read-out signals in a time division fashion and said read-in data-address bus means is also a single wire for transmitting said first and second data signals and said read-in signals in a time division fashion.

10. An arrangement as claimed in claim 8, for use with a system wherein said electronic data processing system is further coupled to a second electronic data processing system of the same type as said first-mentioned data processing system through a communication line for transmitting said first and second data signals to said second data processing system and third data signals from said second data processing system to the first-mentioned data processing system, said third data signals being produced in said second data processing system in the same manner as said first and second data signals are produced in said first-mentioned data processing system, and wherein said data bank means is adapted to be coupled to said communication line and includes means for storing said third data signals and for reproducing said third data signals and producing additional read-in signals in timed relation to said read-in signals whereby said third data signals are reproduced in predetermined time relation to said additional read-in signals, said each input device being responsive to each of preselected ones of said additional read-in signals for supplying that one of said third data signals to the central processing unit connected to said each input device which is transmitted through said read-in bus means in said predetermined time relation to said each preselected additional read-in signal.

11. An arrangement as claimed in claim 8, wherein:
said read-out bus means comprises read-out address bus means for transmitting said read-out signals from said read-out signal producing means to said output devices, and read-out data bus means for transmitting said first and second data signals from said output devices to said data bank means in timed relation to said read-out signals, said read-in bus means comprises read-in address bus bar means and read-in data bus means, said data bank means produces read-in signals with reference to said read-out signals whereby said first and second data signals are reproduced in predetermined time relation to said read-in signals, said read-in address bus means thereby transmitting said read-in signals from said data bank means, said read-in data bus means thereby transmitting said first and second data signals from said data bank means in said predetermined time relation to said read-in signals, and said read-in bus means further comprises a plurality of input devices connected to said read-in address and data bus means and adapted to be connected to said central processing units, each of said input devices being responsive to each of preselected ones of said read-in signals for supplying that one of said first and second data signals to the central processing unit connected to said each input device which is transmitted through said read-in data bus means in said predetermined time relation to said each preselected read-in signal.

12. An arrangement as claimed in claim 11, wherein: said read-out signal producing means comprises a first read-out signal generator for cyclically producing first read-out signals and a second read-out signal generator for cyclically producing second read-out signals, said output devices comprise first output devices adapted to be connected to said signal sources and second output devices connected to said buffer memories, said data bank means comprises a first data bank and a second data bank, said read-out address bus means comprises a first read-out address bus for transmitting said first read-out signals from said first read-out signal generator to said first output devices and first data bank, and a second read-out address bus for transmitting said second read-out signals from said second read-out signal generator to said second output devices and second data bank, said read-out data bus means comprises a first read-out data bus for transmitting said first data signals from said first output devices to said first data bank in first timed relation to said first read-out signals, and a second read-out data bus for transmitting said second data signals from said second output devices to said second data bank in second timed relation to said second read-out signals, said first and second data banks thereby storing said first and second data signals with reference to said first and second read-out signals and producing first and second read-in signals with reference to said first and second read-out signals whereby said first and second data signals are reproduced in first and second predetermined time relation to said first and second read-in signals, respectively, said read-in address bus means comprises a first read-in address bus for transmitting said first read-in signals from said first data bank, and a second read-in address bus for transmitting said second read-in signals from said second data bank, said read-in data bus means comprises a first read-in data bus for transmitting said first data signals from said first data bank in said first predetermined time relation to said first read-in signals, and a second read-in data bus for transmitting said second data signals from said second data bank in said second predetermined time relation to said second read-in signals, and said input devices comprise first input devices connected to said first read-in address and data buses, and second input devices connected to said second read-in address and data buses, each of said first input devices being responsive to each of preselected ones of said first read-in signals for supplying that one of said first data signals to the central processing unit connected to said each first input device which is transmitted through said first read-in data bus in said first predetermined time relation to said each preselected first read-in signal, each of said second input devices being responsive to each of preselected ones of said second read-in signals for supplying that one of said second data signals to the central processing unit connected to said each second input device which is transmitted through said second read-in data bus in said second predetermined time relation to said each preselected second read-in signal.

* * * * *